US009946924B2

(12) United States Patent
Sengupta et al.

(10) Patent No.: US 9,946,924 B2
(45) Date of Patent: Apr. 17, 2018

(54) SYSTEM AND METHOD FOR AUTOMATING INFORMATION ABSTRACTION PROCESS FOR DOCUMENTS

(71) Applicant: Accenture Global Services Limited, Dublin (IE)

(72) Inventors: Shubhashis Sengupta, Bangalore (IN); Annervaz Karukapadath Mohamedrasheed, Trichur (IN); Chakravarthy Lakshminarasimhan, Chennai (IN); Manisha Kapur, New Delhi (IN); Jovin George, Bangalore (IN); Mansi Srivastava, Bangalore (IN); Vaidya Sumanth, Bangalore (IN); Rajeh Ganesh Natrajan, Chennai (IN); Siddesha Swamy, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 310 days.

(21) Appl. No.: 14/836,659

(22) Filed: Aug. 26, 2015

(65) Prior Publication Data
US 2016/0364608 A1 Dec. 15, 2016

(30) Foreign Application Priority Data
Jun. 10, 2015 (IN) .......................... 2902/CHE/2015

(51) Int. Cl.
*G06F 17/21* (2006.01)
*G06K 9/00* (2006.01)
(Continued)

(52) U.S. Cl.
CPC ..... *G06K 9/00456* (2013.01); *G06F 17/2264* (2013.01); *G06F 17/2745* (2013.01);
(Continued)

(58) Field of Classification Search
None
See application file for complete search history.

(56) References Cited

U.S. PATENT DOCUMENTS

2005/0065975 A1* 3/2005 McDonald .......... G06F 17/2705
2005/0182736 A1* 8/2005 Castellanos ........... G06F 17/271
705/80
(Continued)

FOREIGN PATENT DOCUMENTS

WO WO 03/017130 A1 2/2003

OTHER PUBLICATIONS

"Drop-down list," dated Mar. 26, 2015, p. 1, Wikipedia, available at en.wikipedia.org/wiki/Drop-down_list.
(Continued)

*Primary Examiner* — Asher D Kells
(74) *Attorney, Agent, or Firm* — Brinks Gilson & Lione

(57) ABSTRACT

A computer-implemented method, a processing pipeline and a system create a hierarchical semantic map of a document and extracted information. The method includes apportioning the document into major sections by accessing the document, recognizing a hierarchical structure of the document, and dividing the document into the major sections by using a data profiler and a machine learning module, classifying the major sections, and mapping the major sections to key elements in one of the multiple levels, searching one major section, and identifying sub-sections from the one major section to achieve a maximum confidence score indicates that the sub-sections associate with the key element, extracting the information from the identified sub-sections by using sequence modelers and linguistic characteristics provided by the data profiler, generating the hierarchical semantic map of the document by using the
(Continued)

extracted information, and displaying in a user interface drop down selections of the key elements.

15 Claims, 14 Drawing Sheets

(51) Int. Cl.
    *G06F 17/30*     (2006.01)
    *G06F 17/22*     (2006.01)
    *G06F 17/27*     (2006.01)
    *G06K 9/22*     (2006.01)
    *G06K 9/62*     (2006.01)
    *G06K 9/68*     (2006.01)

(52) U.S. Cl.
    CPC .. *G06F 17/30705* (2013.01); *G06F 17/30719* (2013.01); *G06K 9/00463* (2013.01); *G06K 9/00469* (2013.01); *G06K 9/228* (2013.01); *G06K 9/623* (2013.01); *G06K 9/6227* (2013.01); *G06K 9/6857* (2013.01)

(56) References Cited

U.S. PATENT DOCUMENTS

2007/0061755 A1*  3/2007  Taboada ................ G06F 3/0481
    715/818
2015/0032645 A1*  1/2015  McKeown ............ G06F 17/301
    705/311

OTHER PUBLICATIONS

European Search Report, dated Oct. 13, 2016, pp. 1-10, European Patent Application No. 16173526.1-1952, European Patent Office, Munich, Germany.

\* cited by examiner

When lease abstractor/reviewer needs to fill in a particular key element (a piece of information to be extracted from a document), relevant section(s) of the lease document is shown or highlighted

CAMEXCL(DCT)

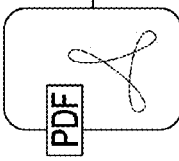
Lease

LANDLORD'S MAINTENANCE.

(a) This Lease is intended to be a net lease; accordingly, Landlord's maintenance obligations are limited to the maintenance and replacement of the Building's roof and maintenance of the foundation piers and structural members of the exterior walls (collectively, the "Building's Structure"), any repairs covered by the one year construction warranty provided by the general contractor, and repairs to concealed underground plumbing caused by the failure of the Building's Structure (and excluding, without limitation, damage caused by a Tenant Party); however, Landlord shall not be responsible (1) for any such work until Tenant delivers to Landlord written notice of the need therefor or (2) for alterations to the Building's Structure required by Law because of Tenant's use of the Premises (which alterations shall be performed by Tenant). The Building's Structure does not include windows or components thereof (including caulking, flashing, etc.), glass or plate glass, doors, special store fronts or office entries, all of which shall be maintained by Tenant Landlord's liability for any defects, repairs, replacement or maintenance for which Landlord is responsible hereunder shall be limited to the cost of performing such work.

SYSTEM AND METHOD FOR AUTOMATING INFORMATION ABSTRACTION PROCESS FOR DOCUMENTS

CROSS-REFERENCE TO RELATED APPLICATIONS

This application claims the benefit of India Provisional Application No. 2902/CHE/2015, filed on Jun. 10, 2015, which is hereby incorporated by reference in its entirety.

FIELD OF THE TECHNOLOGY

The disclosure relates to the field of document process automation, and more particularly, it relates to a method, a system and a method for automating information abstraction process for large documents.

BACKGROUND OF THE TECHNOLOGY

A computer system may be used for processing a text document that contains information. The computer system may create a summary that retains important points of the original document. Conventional computer system may be insufficient or inadequate when the document structure is taken into account for automating information abstraction for documents. As such, there are technical problems to be resolved in order to automatically abstract specific, well defined information from documents by using the computer system and data processing technologies.

SUMMARY

Examples of the present disclosure provide at least a computer system and a computer-implemented method, which include a processing pipeline for automating information abstraction process for documents.

In one embodiment, the present disclosure provides a computer system for creating a hierarchical semantic map of a document and extracted information. The computer system may include a processor and a non-transitory computer readable medium storing processor executable instructions configured to cause the processor to: apportion, with the processor, the document into major sections by accessing the document, recognizing a hierarchical structure of the document, and dividing the document into the major sections by using a data profiler and a machine learning module where the data profiler and the machine learning module may be pre-determined and may be saved in a database.

The computer system may classify, with the processor, the major sections of the document by using a classification with multiple levels from the machine learning module, and map the major sections to key elements in one of the multiple levels, and search, with the processor, one major section that is mapped to one key element, and identify sub-sections within the one major section to achieve a maximum confidence score based on the machine learning module, where the maximum confidence score may indicate that the sub-sections associate with the key element, and the sub-sections further contain granular level pieces of information comprising sub-granular clause types forming the key element according to the machine learning module.

The computer system may extract the granular level pieces of information comprising the sub-granular clause types from the identified sub-sections by using sequence modelers and linguistic characteristics provided by the data profiler, generate the hierarchical semantic map of the document by using the extracted information according to the hierarchical structure, and store the extracted information and the hierarchical semantic map associations in the database, and present in a user interface in a user display device drop down selections of the key elements of the document, and in response to a selection of one of the key elements, display the extracted information associated with the selected key element.

In another embodiment, the present disclosure provides a method for creating a hierarchical semantic map of a document and extracted information. The method may include steps of apportioning with a data processor the document into major sections by accessing the document, recognizing a hierarchical structure of the document, dividing the document into the major sections by using a data profiler and a machine learning module where the data profiler and the machine learning module may be pre-determined and may be saved in a database, classifying with the data processor the major sections of the document by using a classification with multiple levels from the machine learning module, mapping the major sections to key elements in one of the multiple levels, searching with the data processor one major section that may be mapped to one key element, and identifying sub-sections within the one major section to achieve a maximum confidence score based on the machine learning module, where the maximum confidence score may indicate that the sub-sections associate with the key element, and the sub-sections may further contain granular level pieces of information comprising sub-granular clause types forming the key element according to the machine learning module.

The method may further include steps of extracting the granular level pieces of information comprising the sub-granular clause types from the identified sub-sections by using sequence modelers and linguistic characteristics provided by the data profiler, generating the hierarchical semantic map of the document by using the extracted information according to the hierarchical structure, and storing the extracted information and the hierarchical semantic map associations in the database in a memory storage device, and presenting in a user interface on a user display device drop down selections of the key elements of the document, and in response to a selection of the key elements, displaying the extracted information associated with the selected key element.

In another embodiment, the present disclosure provides a system having a processing pipeline for creating a hierarchical semantic map of a document and extracted information. The system may include: a processor, a data communication network in communication with the processor, a display device in communication with the data communication network, the display device comprising a user interface, a database coupled with the data communication network, and a non-transitory computer readable medium coupled with the processor and the data communication network; the non-transitory computer readable medium storing processor executable instructions comprising the processing pipeline including a document retriever, a document classifier, a document mapper, a document extractor and a result viewer.

The document retriever may be configured to cause the processor to apportion the document into major sections by accessing the document, recognizing a hierarchical structure of the document, and dividing the document into major sections by using a data profiler and a machine learning module where the data profiler and the machine learning module may be pre-determined and may be saved in a database, the document classifier may be configured to cause the processor to classify the major sections of the document by using a classification with multiple levels from the machine learning module, and map the major sections to key elements in one of the multiple levels, and the document mapper may be configured to cause the processor to search one major section that may be mapped to one key element, and identify sub-sections within the one major section to achieve a maximum confidence score based on the machine learning module, where the maximum confidence score may indicate that the sub-sections associate with the key element, and the sub-sections may further contain granular level pieces of information comprising sub-granular clause types forming the key element according to the machine learning module.

The document extractor may be configured to cause the processor to extract the granular level pieces of information including the sub-granular clause types from the identified sub-sections by using sequence modelers and linguistic characteristics provided by the data profiler, generate the hierarchical semantic map of the document by using the extracted information according to the hierarchical structure, and store the extracted information and the hierarchical semantic map associations in the database, and the result reviewer may be configured to cause the processor to present in the user interface drop down selections of the key elements of the document, and in response to a selection of one of the key elements, display the extracted information associated with the selected key element.

BRIEF DESCRIPTION OF THE DRAWINGS

The system and/or method may be better understood with reference to the following figures and descriptions. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 5 shows an example of relevant lease section for a key element.

FIG. 10 shows an example of displaying annotations for key elements and clause types of a client document.

DETAILED DESCRIPTION OF ILLUSTRATED EXAMPLES

Figure 1:
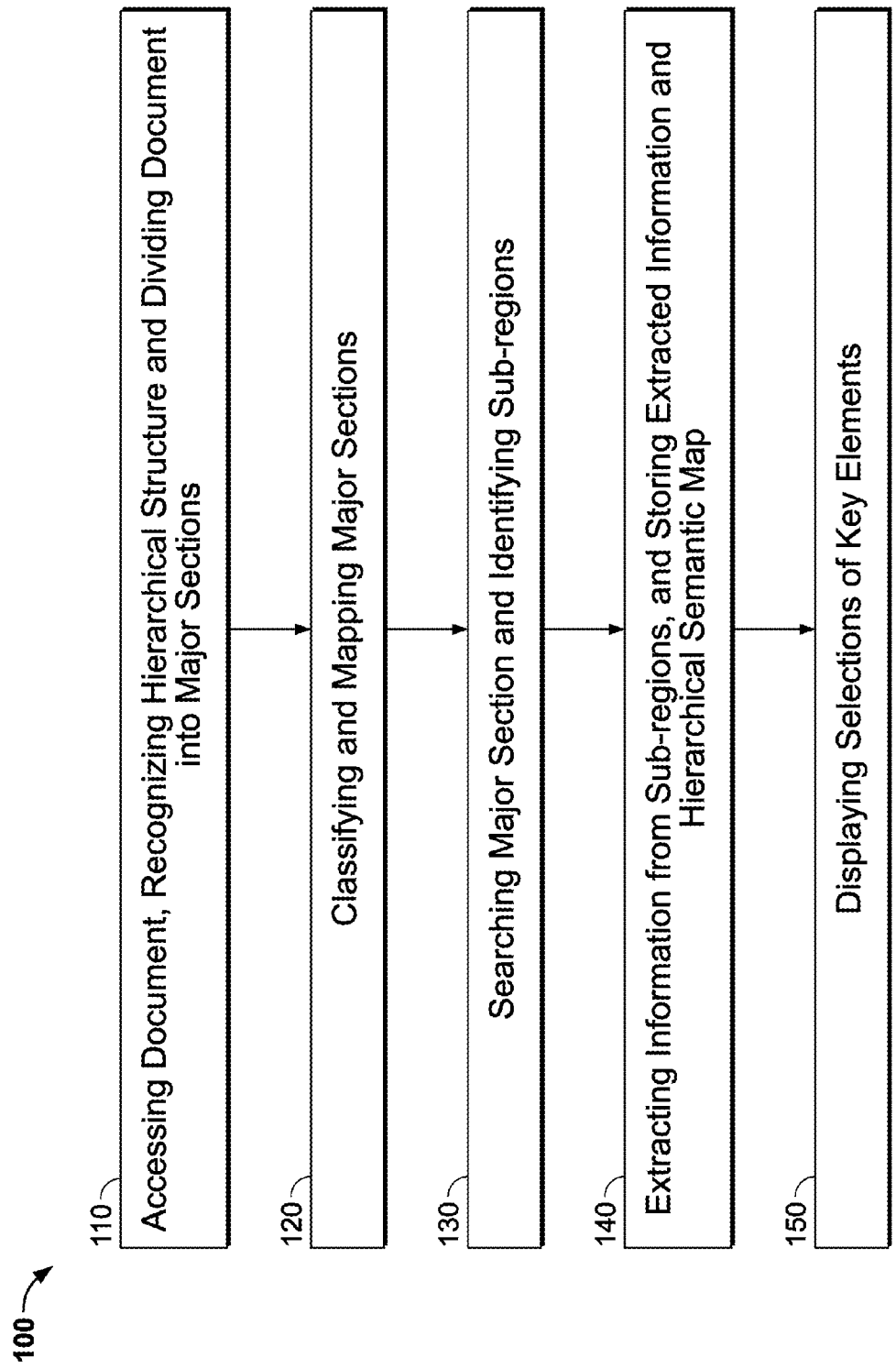
FIG. 1 is a flowchart of one embodiment of a method for creating a hierarchical semantic map of a document and extracted information.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment or a single embodiment. Furthermore, the particular features, structures, or characteristics may be combined in any suitable manner in one or more embodiments or examples.

The terminology used in the description herein is for the purpose of describing particular examples only and is not intended to be limiting. As used herein, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The described communication between devices may include any appropriate type of communication network for providing network connections to the server and client or among multiple servers or clients. For example, communication network may include the Internet or other types of computer networks or telecommunication networks, either wired or wireless. In embodiments, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

It should be noticed that, the embodiments/examples and the features in the embodiments/examples may be combined with each other in a no conflict condition. The inventive aspects will become apparent from the following detailed description when taken in conjunction with the accompanying drawings.

It should be noticed that, the steps illustrated in the flowchart of the drawings may be performed in a set of computer devices using executable program code. And the order of the steps may be different from that in the drawings under some status, although an example logic order is shown in the flowchart.

The purpose, technical proposal and advantages in the examples of the present disclosure will be clear and complete from the following detailed description when taken in conjunction with the appended drawings. The examples described thereinafter are merely a part of examples of the present disclosure, not all examples. Persons skilled in the art can obtain all other examples without creative works, based on these examples.

Automatic abstraction is a process of parsing a text document with a computer system to create an abstraction that preserves important points of the original document, and extract pieces of information presented in the text of a structured template. However, in organizations that process large documents frequently, particularly when such documents may be generally over one hundred (100) pages, the automating information abstraction process becomes important for the organizations to process documents. For example, lease documents may be large. The automating lease abstraction of contract management may reduce the document processing time from forty-eight (48) hours to twenty-four (24) hours. The automating information abstraction process may be helpful for organizations to process documents timely and cost effectively.

The present disclosure discloses a computer-implemented method, processing pipeline and system for creating a hierarchical semantic map of a document and extracted information. The present disclosure discloses an automated classification of the document by creating a structural model of the document, conducting hierarchical segmentation of the document and creating a semantic map of the document according to the presence of information. The automated identification of relevant information is by checking at various levels of granularity and navigating to the document segment where relevant information is present. The disclosed method, the processing pipeline and the system automatically extract structured information from the document, and collect and store document related information and characteristics of the information to be extracted and continuous recording of the feedback from the user. The disclosed method, pipeline and system may reduce human effort by fifty percent (50%).

FIG. 1 is a flowchart 100 of one embodiment of a method for creating a hierarchical semantic map of a document and extracted information. Steps shown in FIG. 1 may be performed by one or more processors to execute instructions stored in non-transitory computer readable medium.

Step 110: Accessing document, recognizing hierarchical structure and dividing document into major sections. Examples of step 110 may include: apportioning with a data processor the document into major sections by accessing the document, recognizing a hierarchical structure of the document, and dividing the document into major sections by using a data profiler and a machine learning module wherein the data profiler and the machine learning module are pre-determined and saved in a database.

The document to be processed may be accessed electronically. The document may be stored in a computer readable medium (memory, hard disk, flash drive etc.) and may be a certain type of documents. For example, the document may be lease documents. The document may be in various electronic formats. For example, the document may be in PDF format, or in word document format. The document may also be in any other formats that may be accessed electronically via a computer or a processor. Those formats may be either currently known or later developed.

There may be a need to convert the document between different formats. For example, if a document is in PDF format, after the document is accessed and read into the memory, the document may be converted from the PDF format to a text-based format that may be recognized by the computer system.

The document size may be large. The document to be processed may be over one hundred (100) pages. However, the document referred in the current disclosed may not be limited to over one hundred (100) pages. Certain documents, even though they may be less than one hundred (100) pages, they may be within the scope of the present disclosure. For example, even though a lease document may only be thirty (30) pages long, as long as the lease document may have the similar general structure as other lease documents that are over one-hundred (100) page long, the 30-page lease document may be a document and may be automatically processed by using the currently disclosed method.

The document may have a hierarchical structure. The document to be processed may have a structure with multiple levels. For example, a lease document may be structured in three levels. The first level of a lease document may have rent and the length of lease term. The rent level may further include a sub-level that may include sections for the late fee and default. The late fee, in the second level, may include clauses for the interest of the late fee, and the interest clause may be in the third level of the lease document.

There may be a number of major sections of the document. For example, a lease document may be divided into sections for assignment, subordination, alternation, insurance, default, parking, security deposit, etc. Because of the similarity of the same type of documents, the major sections and the hierarchical structure of the document may be pre-determined by using a data profiler and a machine learning module.

The data profiler may be used to recognize the characteristics of the document. The data profiler may recognize the numerical linguistics of the document, such as average length of certain type information. The data profiler may also recognize the linguistics characteristics of the document. For example, the data profile may recognize predicates involved in expressing the information, the position structure in expressing the information, neighboring characteristics, markers at the beginning and end of the information specification, patterns used for expressing the information, and type of the data and induce regular expressions in expressing the information.

The machine learning module may create and retain appropriate classification models for applying in various stages in the processing documents. For example, the machine learning module may create and retain classifiers for each level of hierarchical organization of information for documents. The key elements may be identified from text using the classifiers applied to various pieces of text present in the document. Such classifiers may also be used for identifying the beginning and end point of the information specifications.

The outputs of the data profiler and the machine learning module may be pre-determined. The outputs of results may be pre-determined before the document is accessed, uploaded and processed by a processor and a computer. The outputs of the data profiler and the machine learning module may also be called a model, and may be generated separately from information abstraction process. For example, a separate computerized process may be developed to create a model for a certain type of documents by using the machine learning module and the data profiler. The models include classification models like Support Vector Machines, Random Forest, and sequence models like Conditional Random Fields. The appropriate models are chosen based on the data characteristics by the machine learning and data profile modules. The model may be trained by testing a number of documents after the model is initially created. The model may be further adjusted periodically by using feedbacks received from the information abstraction process for documents. The model may thus be pre-determined separately from the information abstraction process for the documents.

The outputs (model) of data profiler and the machine learning module may be saved in a database. The separately generated model by using the data profiler and the machine learning module may be used in the information abstraction process. In order for the generated model to be read and used in a computerized process, the predetermined model may need to be stored in a database and read later while the information abstraction process for documents takes place. Because the model may be predetermined separately from the information abstraction process and may be saved in a database, the information abstraction process may be performed as a standalone process and may be independent from generating the model.

Step 120: Classifying and mapping major sections. Examples of step 120 may include: classifying with the data processor the major sections of the document by using a classification with multiple levels from the machine learning module, and mapping the major sections to key elements in one of the multiple levels. The key elements may also be called opportunities.

A document may be classified into major sections according to a classification. For example, a lease document may have a three (3) level classification according to the model generated by the machine learning module. An electronically accessed document may be classified into major sections according to the one level of the classification. For example, a lease document may be divided into major sections according to the second level of the classification from the machine learning module, the second level classification of a lease document may include: late fee, hold over, assignment, restoration, default, parking, signage, alteration, insurance, subordination, security deposit, estoppel, etc.

The major sections may be mapped to the key elements of the document. After the major sections of the document are classified, each of major sections may be mapped to a key element of the document. For example, when the $5^{th}$ paragraph of the processed document covers the assignment for the lease as a major section, the $5^{th}$ paragraph may be mapped to the key element assignment of the lease.

Step 130: Searching major section and identifying sub-sections. Examples for step 130 may include: searching with the data processor one major section that is mapped to one key element, and identifying sub-sections within the one major section to achieve a maximum confidence score based on the machine learning module, wherein the maximum confidence score indicates that the sub-section associate with the key element, and the sub-sections further contain granular level pieces of information comprising sub-granular clause types forming the key element according to the machine learning module.

The sub-sections within the document may be identified for one key element. One key element may also be called an opportunity. Each key element may have characteristics like average length(s), and/or starting/ending markers. After the major section in the document for the key element is mapped, sub-sections for the major section may be predicted. The machine learning module may provide a confidence score for the predicted sub-sections within a major section that is associated with a key element. The maximum confidence score may indicate that the sub-sections are most likely associated with the key element.

Because each document may have multiple major sections that may be mapped to multiple key elements (or opportunities), the identification of sub-sections for each major section may be a repeat process. As such, for each major section S that is mapped to an opportunity O, by using the characteristics of the opportunity such average length(s) l, and/or starting/ending markers to search over S for a sub region of l, which maximizes the confidence score of the appropriate machine learning model in predicting the sub-region to be O. In the identified region(s) forming O, the above process is repeated for identifying granular and sub-granular level pieces of information. The sub-regions may contain granular level pieces of information comprising sub-granular clause types forming the key element according to the machine learning module.

Step 140: Extracting information from sub-sections, and storing extracted information and hierarchical semantic map. Examples of step 140 may include: extracting the granular level pieces of information comprising the sub-granular clause types from the identified sub-sections by using sequence modelers like conditional random fields and linguistic characteristics provided by the data profiler, generating the hierarchical semantic map of the document by using the extracted information according to the hierarchical structure, and storing the extracted information and the hierarchical semantic map associations in the database in a memory storage device.

The data profiler may be used to extract lowest level information. After the process for identifying the sub-sections is repeatedly performed, the lowest level granular information may be present in the identified region. When the lowest level granular information is present, the linguistic characteristics derived by the data profiler may be used to extract the information required. The data profiler may provide predicates and structural rules that may be used to extract the information.

The hierarchical semantic map may be generated by using the extracted information according to the hierarchical structure. After the different levels in hierarchical structure of the document are identified and the information is extracted from the document, a hierarchical semantic map may be generated. Such hierarchical semantic map may reflect the hierarchical structure of the processed document.

The extracted information and the hierarchical semantic map may be stored in a database. After the information is extracted and the hierarchical semantic map is generated, they may be stored in the database for the future use. For example, when a lease document is parsed and the information of the lease document is extracted and the hierarchical semantic map of the lease document is generated, the extracted information and the hierarchical semantic map may be stored in the database (such as in a memory, hard disk, flash drive, etc.). Such extracted lease information and the hierarchical semantic map may be obtained and used later by a computer system or a processor.

Step 150: Displaying selections of key elements. Examples for step 150 may include: presenting in a user interface on a user display device drop down selections of the key elements of the document, and in response to a selection of one of the key elements, displaying the extracted information associated with the selected key element.

The extracted information may be associated with the selected key element that may be presented for display in a user interface. For example, a user interface may provide a drop down selections of key elements of the lease document such as late fee, hold over and assignment. A user may select the key element from the drop down selections. After the user selects the key element, the computer or a processor may extract a selected lease document, and the relevant part(s) of the lease document(s) may be displayed in the user interface after the user choose to view the processed document or documents.

The subject matter expert (SME) may create an annotated corpus for a certain type of documents, such as a lease document. SME may create a number of key elements for the type of documents. SME may further create sub elements, so called clause types that are subordinated to the key elements. In addition, SME may create annotations for a combination of a key element and a clause type. The annotation may be associated with a relevant section of an example document for a particular key element/clause type combination. For example, for a combination of key element insurance and clause type commercial general liability, SME may create an annotation having "commercial general liability insurance applicable to the premises and its appurtenances providing on an occurrence basis, a minimum combined single limit of $2,000,000.00."

The data profiler may be created by using the annotated corpus. The data profiler may recognize numerical characteristics comprising an average length of the extracted information such as average representative length(s, by clustering the lengths of the samples) of information to be extracted. Further, the data profiler may recognize linguistics characteristics of the extracted information, where the linguistics characteristics may include predicates involved in expressing the information, position structures in expressing the information, neighboring characteristics, markers at the beginning and end of the information specification, patterns used for expressing the information, and type of the data that induces regular expressions in expressing the information. Data Profiler may additionally identify and train sequence modelers like Conditional Random Fields, which may be used for information extraction.

The machine learning module may also be created by using the annotated corpus that may be created by SME. The step for creating the machine learning module may include: extracting features in the multiple levels according to the hierarchical structure of the document from an annotated corpus that is input by a subject matter expert (SME), applying a selected statistical method to select a subset of the extracted features, where the selected statistical method may be selected from a number of statistical methods in order for achieving classification accuracy, and selecting a classifier from a number of options according to the selected features where selected features may be in one level of the multiple levels that may categorize the features extracted from the annotated corpus.

Semi-supervised learning schemes may be adopted in the solution try to leverage the un-annotated documents as well for training the classifier models. Users may provide raw documents without explicit markings of training samples. These unlabeled samples are also used by the platform in semi-supervised setting. Depending on the availability of the labelled data for training, the platform may resort to semi-supervised learning by Label Propagation and Label Spreading and may induct more training samples from the un-annotated documents. Feature selection may be done either by selecting the features ending with non-zero coefficients when a linear support vector machine is trained or by doing statistical test like chi-square and picking the top x percentile features.

An example of creating a machine learning module may include five (5) steps. (1) Reading the data, and converting the data into numerical features, based on VSM n-gram model and TF-IDF computation; (2) Appropriating the feature selection by using the statistical method such as Chi Square and/or other methods to optimize for maximum classification accuracy; (3) Depending on the type of data and characteristics, choosing appropriate classifier from a number of models such as: Support Vector Machines, Random Forest, Multinomial Naïve Bayes and tuning the parameters for the classifier to find the model that works best on the data; (4) Correlating the features of various information pieces and grouping them such that most likely features that occur together or exist in neighborhood are identified; and (5) Creating and retaining appropriate classification models for applying in various stages in automatically processing the document, where each level of hierarchical organization of information may have classifiers, where the classifiers may be used for identifying the beginning and end point of the information specifications.

The model may be trained after it is created. The model may be created by the data profiler and the machine learning module by using the annotated corpus that is created by SME. The model may be trained to find the classifiers at each level that works the best for the data and best sequence modelers for information extraction. The training of the model may be conducted by reading a number of example documents having a same type and comparing results of the model for the number of documents, and identifying the best classifier for each level in the hierarchical structure of the document. The classifiers for different levels of document may be different. The model training may take several iterations of steps of reading, comparing and identifying.

The model may be regenerated. The user for the information abstraction process may provide feedback, and the model may be regenerated by using the machine learning module and the data profiler according to the feedback. The user who provides the feedback may be SME. SME may provide the feedback through a user interface. The feedback may trigger the machine learning module and data profiler to regenerate the model at appropriate intervals or when sufficient learning data/feedback becomes available.

Figure 2:
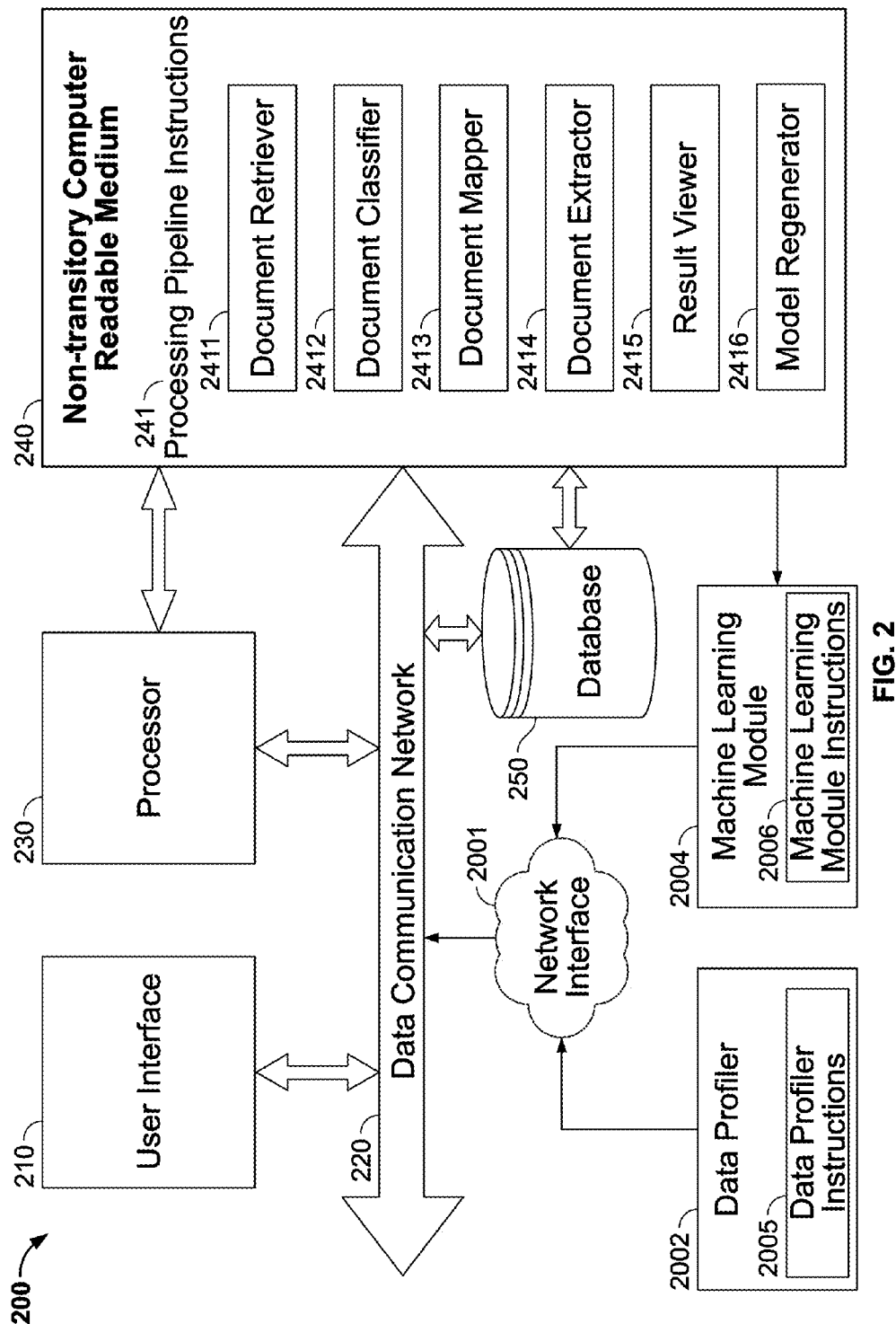
FIG. 2 illustrates one embodiment of a processing pipeline for creating a hierarchical semantic map of a document and extracted information.

FIG. 2 illustrates one embodiment of a processing pipeline 200 for creating a hierarchical semantic map of a document and extracted information. As shown in FIG. 2, the processing pipeline may include one or more processors 230, a non-transitory computer readable medium 240, a user interface 210, a database 250, and a data communication network 220 that may be used to connect the processor 230, the non-transitory computer readable medium 240, the user interface 210 and the database 250. The processing pipeline 200 may communicate with a data profiler 2002 and a machine learning module 2004 via a network interface 2001. The data profiler 2002 may include data profiler instructions 2005, and the machine learning module 2004 may include machine learning module instructions 2006. The non-transitory computer readable medium may store processing pipeline instructions that may include a document retriever 2411, document classifier 2412, a document mapper 2413, a document extractor 2414, a result viewer 2415 and a model regenerator 2416.

One example implementation of the processing pipeline 200 may include a processor 230, a user interface 210, a database 250, a non-transitory computer readable medium 240, and a data communication network 220, wherein the non-transitory computer readable medium 240 storing processor executable instructions 241 comprising a document retriever 2411, a document classifier 2412, a document mapper 2413, a document extractor 2414 and a result viewer 2415.

The document retriever 2411 may be configured to cause the processor to apportion the apportion the document into major sections by accessing the document, recognizing a hierarchical structure of the document, and dividing the document into major sections by using a data profiler and a machine learning module where the data profiler and the machine learning module may be pre-determined and may be saved in a database.

The document classifier 2412 may be configured to cause the processor to classify the major sections of the document by using a classification with multiple levels from the machine learning module, and map the major sections to key elements in one of the multiple levels.

The document mapper 2413 may be configured to cause the processor to search one major section that is mapped to one key element, and identify sub-sections from the one major section to achieve a maximum confidence score based on the machine learning module, where the maximum confidence score may indicate that the sub-sections may associate with the key element, and the sub-sections may further contain sub-granular level pieces of information comprising clause types forming the key element according to the machine learning module.

The document extractor 2414 may be configured to cause the processor to extract the granular level pieces of information including the sub-granular clause types from the identified sub-sections by using sequence modelers like Conditional Random Fields and linguistic characteristics provided by the data profiler, generate the hierarchical semantic map of the document by using the extracted information according to the hierarchical structure, and store the extracted information and the hierarchical semantic map associations in the database.

The result reviewer 2415 may be configured to cause the processor to present in the user interface drop down selections of the key elements of the document, and in response to a selection of one of the key elements, display the extracted information associated with the selected key element.

A data profiler 2002 and a machine learning module 2004 may be connected with the processing pipeline 2004 via a network interface 2001.

The data profiler 2002 may be created by using an annotated corpus and may include processor executable instructions 2005 that may cause the processor to: recognize numerical characteristics comprising an average length of the extracted information, and recognize linguistics characteristics of the extracted information, where the linguistics characteristics may include predicates, structures, neighboring characters, and types of data that induce regular expressions of the extracted information. Additionally Data profiler 2002 may identify and train sequence modelers like Conditional Random Fields, which may be used for information extraction.

The machine learning module 2004 may be created and may include the processor executable instructions 2006 that may cause the processor to: extract features in the multiple levels according to the hierarchical structure of the document from an annotated corpus that is input by a subject matter expert, apply a selected statistical method to select a subset of the extracted features, where the selected statistical method may be selected from a number of statistical methods in order for achieving classification accuracy, and select a classifier from a number of options according to the selected features wherein selected features are in one level of the multiple levels that categorize the features extracted from the annotated corpus. And, the number of options for the selected classifier may include at least one of: Support Vector Machines, Random Forest, and Multinomial Naïve Bayes.

The non-transitory computer readable medium 240 of the processing pipeline 200 may include instructions 241 of a model regenerator 2416 that may cause the processor to regenerate the machine learning module and the data profiler to be stored in the database according to a feedback for the generated hierarchical semantic map and the extracted information where the feedback may be received from a subject matter expert through a user interface.

Figure 3:
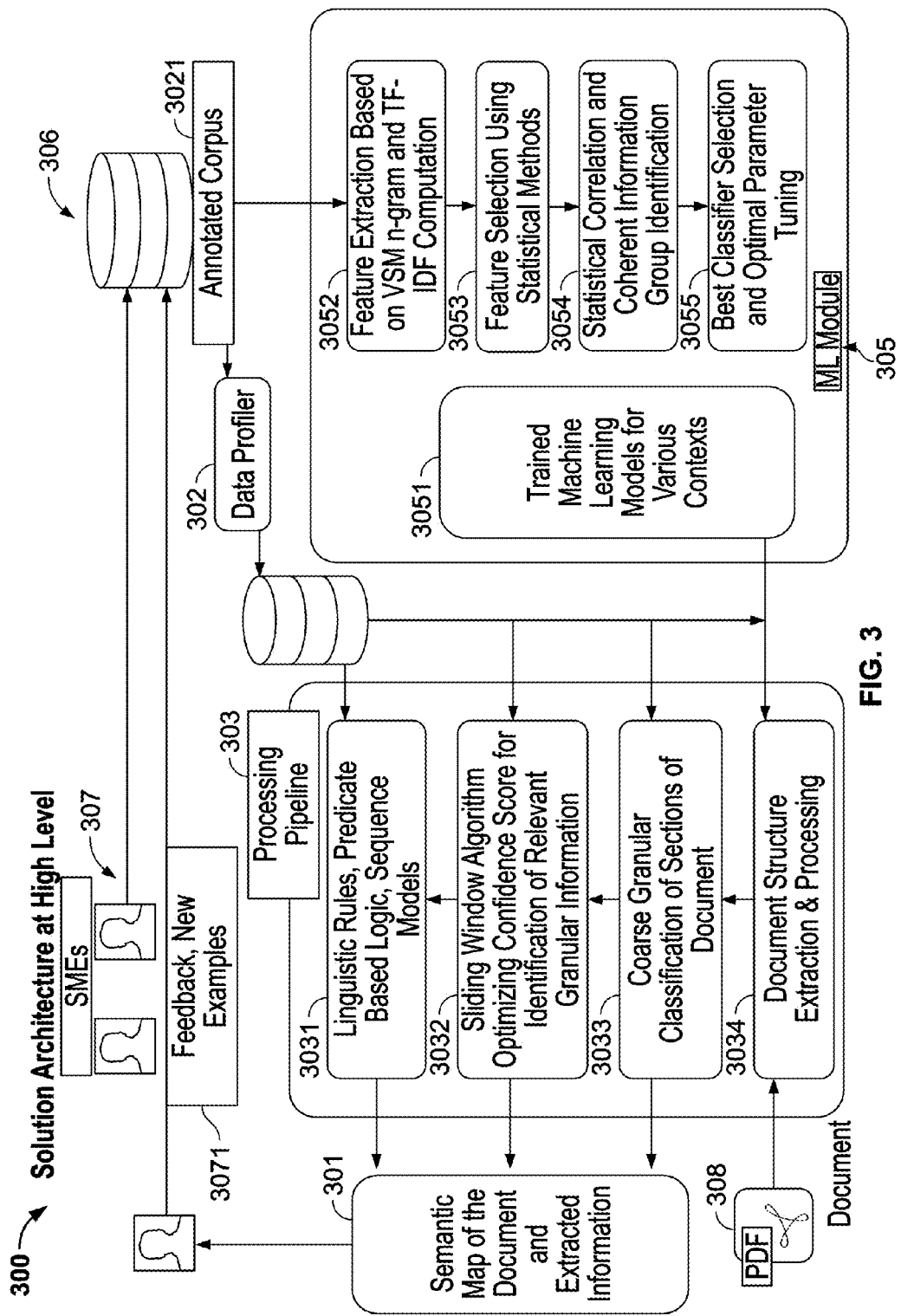
FIG. 3 illustrates one embodiment of a system for creating a hierarchical semantic map of a document and extracted information.

FIG. 3 illustrates one embodiment of a system for creating a hierarchical semantic map of a document and extracted information 300. As shown in FIG. 3, the document 308 may be processed to form the semantic map of the document and extracted information 301. In FIG. 3, the document 308 may be processed by using processing pipeline 303, data profiler 302 and machine learning module (ML Module) 305. The processing pipeline 303 may include document structure extraction & processing 3034, coarse granular classification of section of document 2022, sliding window algorithm optimizing confidence score for identification of relevant granular information 3032 and linguistic rules, predicate based logic, sequence models 3031. The processing pipeline 303 may be fed by data profiler 302 and ML module 305. Both data profiler 302 and ML module 305 may be generated by using annotated corpus 3021 that may be stored in database 306. The annotated corpus 3021 may be created directed by subject matter experts (SMEs) 307 or may be created by SMEs 307 by utilizing feedback and new examples 3071 that may be generated from semantic map of the document and extracted information 301. The ML module 305 may be generated by steps feature extraction based on VSM n-gram and TF-IDF computation 3052, Feature election using statistical methods 3053, statistical correlation and coherent information group identification 3054 and best classifier selection and optimal parameter tuning 3055. The trained machine learning models for various context 3051 may be stored after they are generated.

An example of implementing the system as shown in FIG. 3 may be a computer-implemented system that may include: a processor and a non-transitory computer readable medium storing processor executable instructions. The processor executable instructions may be configured to cause the processor to: apportion, with the processor, the document into major sections by accessing the document, recognizing a hierarchical structure of the document, and dividing the document into the major sections by using a data profiler and a machine learning module where the data profiler and the machine learning module may be pre-determined and may be saved in a database.

The processor executable instructions may be further configured to cause the processor to: classify the major sections of the document by using a classification with multiple levels from the machine learning module, and map the major sections to key elements in one of the multiple levels, search one major section that is mapped to one key element, and identify sub-sections from the one major section to achieve a maximum confidence score based on the machine learning module, where the maximum confidence score may indicate that the sub-sections associate with the key element, and the sub-sections may further contain sub-granular level pieces of information comprising clause types forming the key element according to the machine learning module.

The processor executable instructions may be configured to cause the processor to: extract the granular level pieces of information comprising the sub-granular clause types from the identified sub-sections by using sequence modelers like Conditional Random Fields and linguistic characteristics provided by the data profiler, generate the hierarchical semantic map of the document by using the extracted information according to the hierarchical structure, and store the extracted information and the hierarchical semantic map associations in the database, and present in a user interface in a user display device drop down selections of the key elements of the document, and in response to a selection of one of the key elements, display the extracted information associated with the selected key element.

The processor executable instructions of the computer-implemented system may be configured to cause the processor to create the data profiler by using an annotated corpus, where the processor executable instructions may be configured to cause the processor to: recognize numerical characteristics comprising an average length of the extracted information; and recognize linguistics characteristics of the extracted information, where the linguistics characteristics may include predicates, structures, neighboring characters, and types of data that induce regular expressions of the extracted information. The processor executable instructions may further be configured to identify and train sequence modelers like Conditional Random Fields, which can be used for information extraction.

The processor executable instructions of the computer-implemented system may be configured to cause the processor to create the machine learning module, where the processor executable instructions may be configured to cause the processor to: extract features in the multiple levels according to the hierarchical structure of the document from an annotated corpus that may be input by a subject matter expert, apply a selected statistical method to select a subset of the extracted features, where the selected statistical method comprising Chi square may be selected from a number of statistical methods in order for achieving classification accuracy, and select a classifier from a number of options according to the selected features, where selected features may be in one level of the multiple levels that may categorize the features extracted from the annotated corpus, and the number of options for the selected classifier may include Support Vector Machines, Random Forest, and Multinomial Naïve Bayes.

The processor executable instructions of the computer-implemented system may be configured to cause the processor to regenerate the machine learning module and the data profiler to be stored in the database according to a feedback for the generated hierarchical semantic map and the extracted information where the feedback may be received from a subject matter expert through a user interface.

For extraction of the higher level fields (opportunity) for different client source documents, Support Vector Machines (SVM) with different kernels and parameters may show maximum training accuracy. At the highest level, the training samples may be comparatively larger in size and for text classification tasks the SVM Machines may perform best. However when the size of the training samples varies, other methods may show better results. It may be observed that for various opportunities (having different text sizes) other models like Random Forests and Multinomial Naive Bayes may outperform SVM. As such, the platform may support generic processing paradigm that may allow the data choose the model.

The best selected model (along with its relevant features) may not only give high training accuracy, but may give good generalization results as well. The precision and recall on the test documents may illustrate this. For example, some rules may not give good recall, although the precision may be good. To improve the recall of the final extraction phase, more contextual extraction rules and other sequence learning based approaches may also be formulated.

Figure 4:
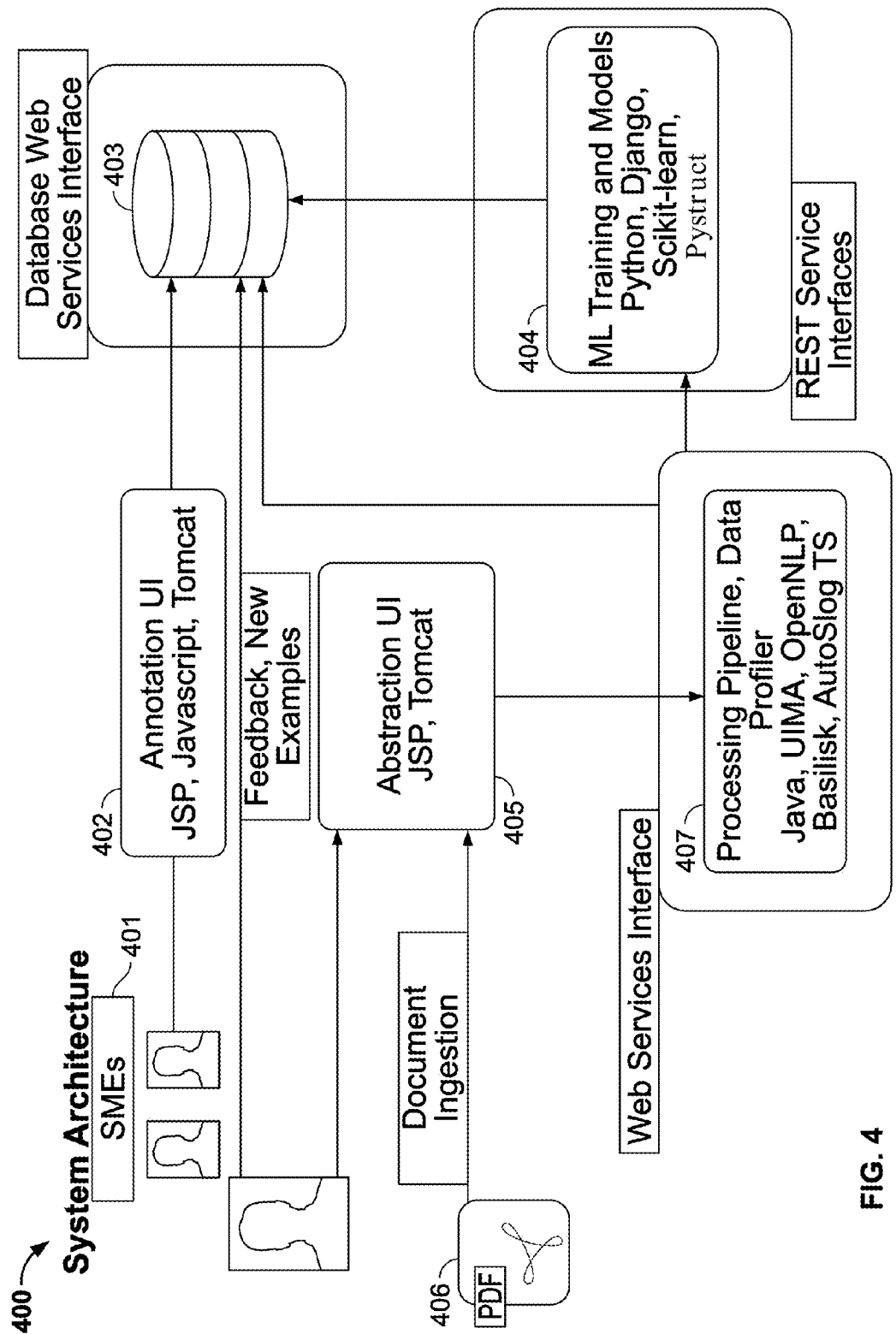
FIG. 4 illustrates a system architecture for creating a hierarchical semantic map of a document and extracted information.

FIG. 4 illustrates a system architecture for creating a hierarchical semantic map of a document and extracted information. As shown in FIG. 4, SMEs 401 may provide annotations through an annotation user interface (UI) 402. The annotations may be saved to a database 403. The machine learning module may generate and train models 404, and the generated and trained models may also be stored in the database (not shown). The user may access the information abstraction system via abstraction user interface (UI) 405. The documents 406 to be processed and abstracted may be loaded through the abstraction UI 405. The abstraction UI may trigger the processing pipeline 407 for automating the information abstraction process for the document.

FIG. 5 shows an example of relevant lease section for a key element 500. As shown in FIG. 5, a lease abstractor or a reviewer may need to identify relevant section(s) of the lease document 501 for a particular key element. The highlighted section shown in FIG. 5 may be for the landlord's maintenance 502. The highlighted section may be generated from an OCR process, and some typos may be included. The disclosed system may handle documents with various qualities including documents with typos as shown in FIG. 5.

Figure 6:
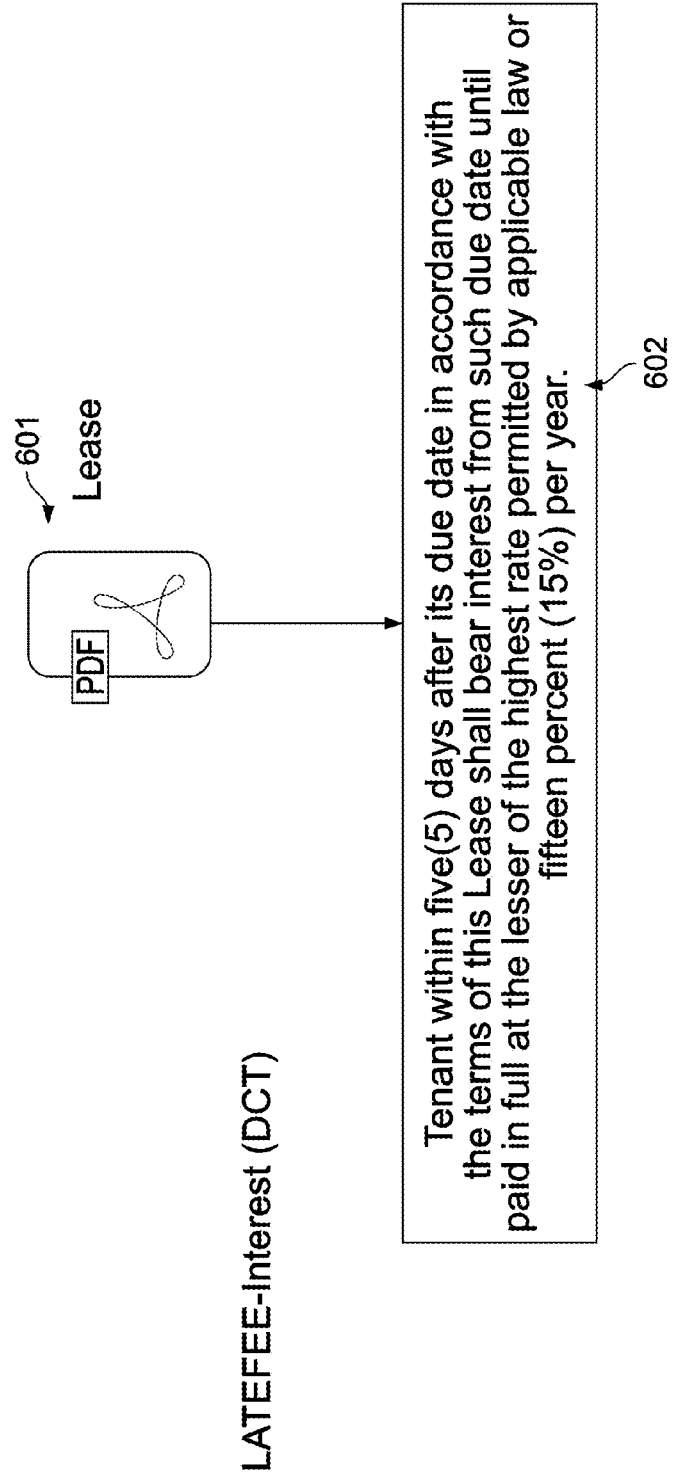
FIG. 6 shows an example of relevant lease sentences for a clause type of the key element.

FIG. 6 shows an example of relevant lease sentences for a clause type of the key element 600. As shown in FIG. 6, a lease abstractor or a reviewer may need to identify relevant sentences of a lease document 601 for a particular clause of a particular key element. The clause identified as shown in FIG. 6 may be for a clause of interest for the key element late fee 602.

Figure 7:
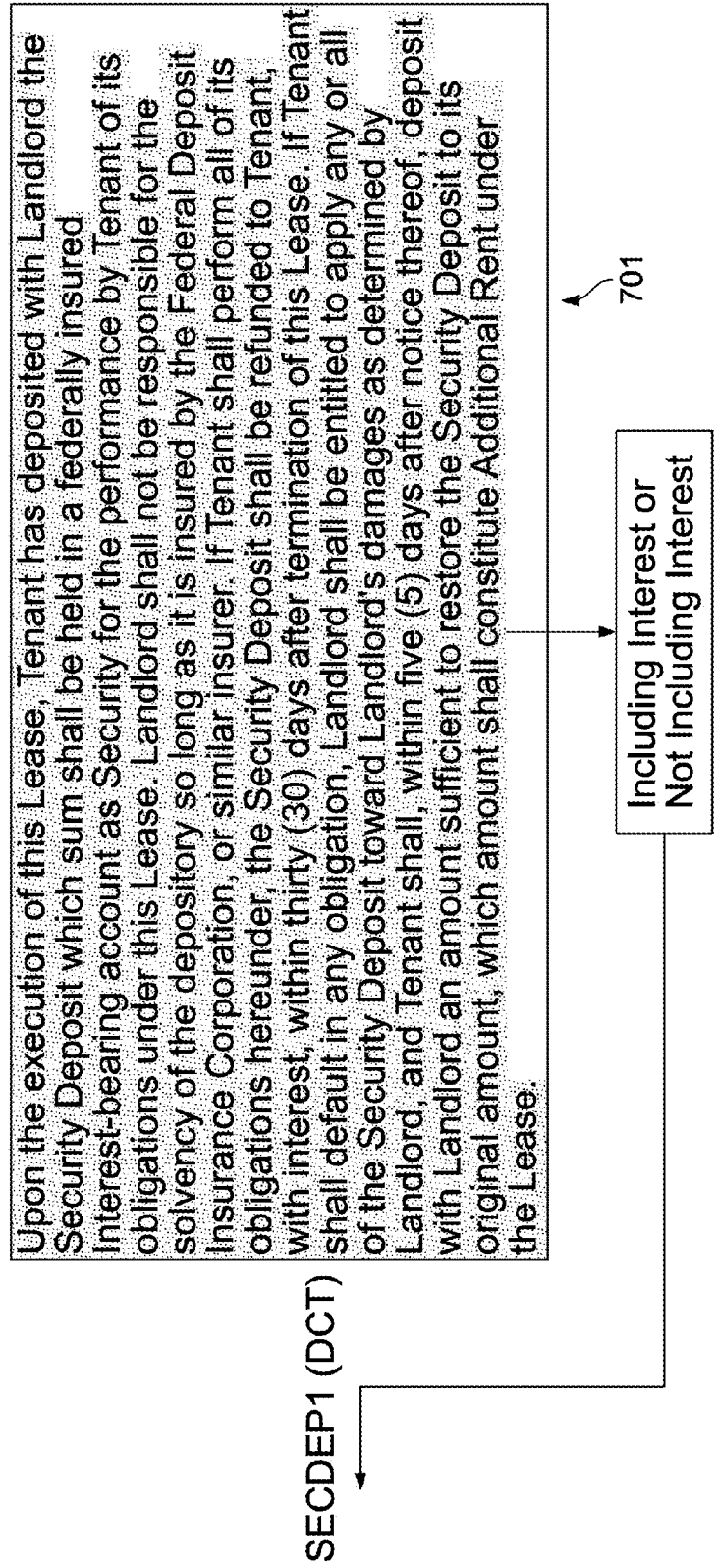
FIG. 7 shows an example of bucketing the clauses to one or more pre-defined set.

FIG. 7 shows an example of bucketing the clauses to one or more pre-defined set 700. Sometimes, a section of the lease document may include multiple clauses. For example, a section of security deposit of a lease may include clauses for both including interest and not including interest. As shown in FIG. 7, the security deposit section 701 provides clauses for including the interest (when the security deposit is refunded to tenant) and not including the interest (when the landlord applies the security deposit toward landlord's damages).

Figure 8:
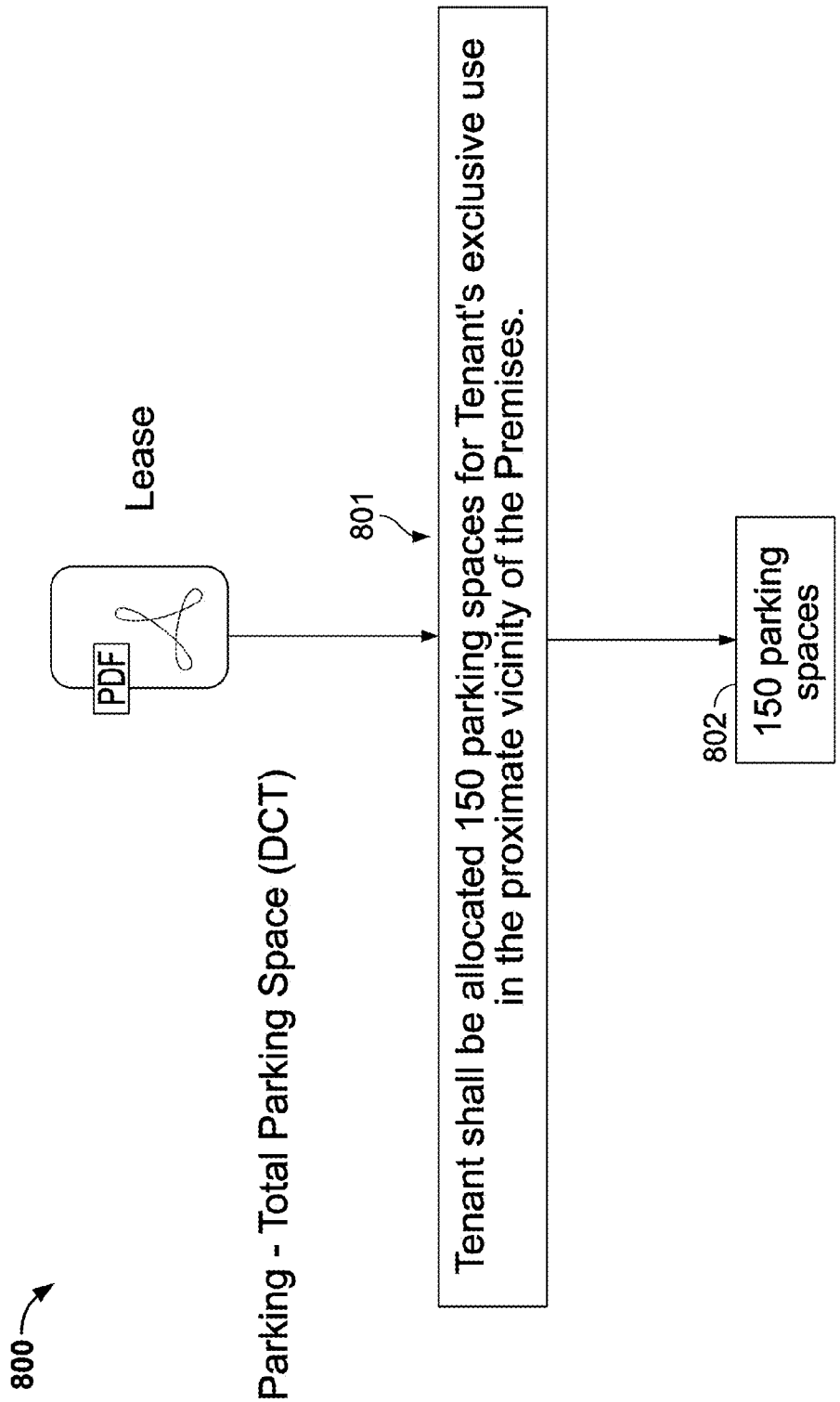
FIG. 8 illustrates an example of identifying a lease sentence for the parking space.

FIG. 8 illustrates an example of identifying a lease sentence for the parking space 800. Sometimes, a sentence of a lease may be for a key element. As shown in FIG. 8, the sentence 801 specifies the key element parking spaces, which states that tenant shall be allocated one hundred and fifty (150) parking spaces 802.

Figure 9:
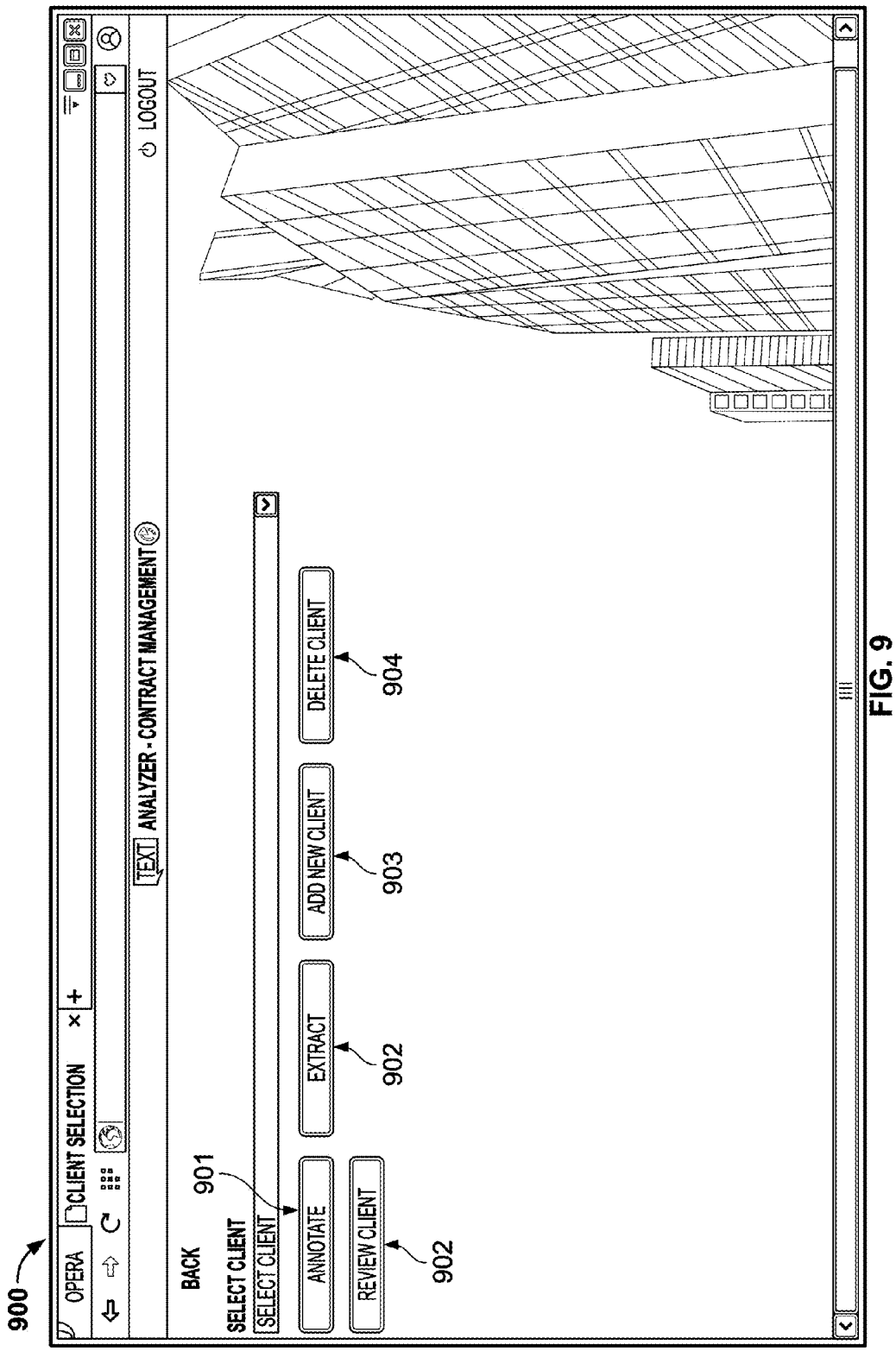
FIG. 9 shows an example of selecting a client for automating the information abstraction process.

FIG. 9 shows an example of selecting a client for automating the information abstraction process 900. Different organizations may have different document structures. The information abstraction process may need to identify the client for the process to be developed for. As shown in FIG. 9, a client may be selected for annotating 901 and extracting 902. A new client may be added 903 and an existing client may be deleted 904. FIG. 9 also shows a user may select a button for reviewing a client 905.

Figure 10:
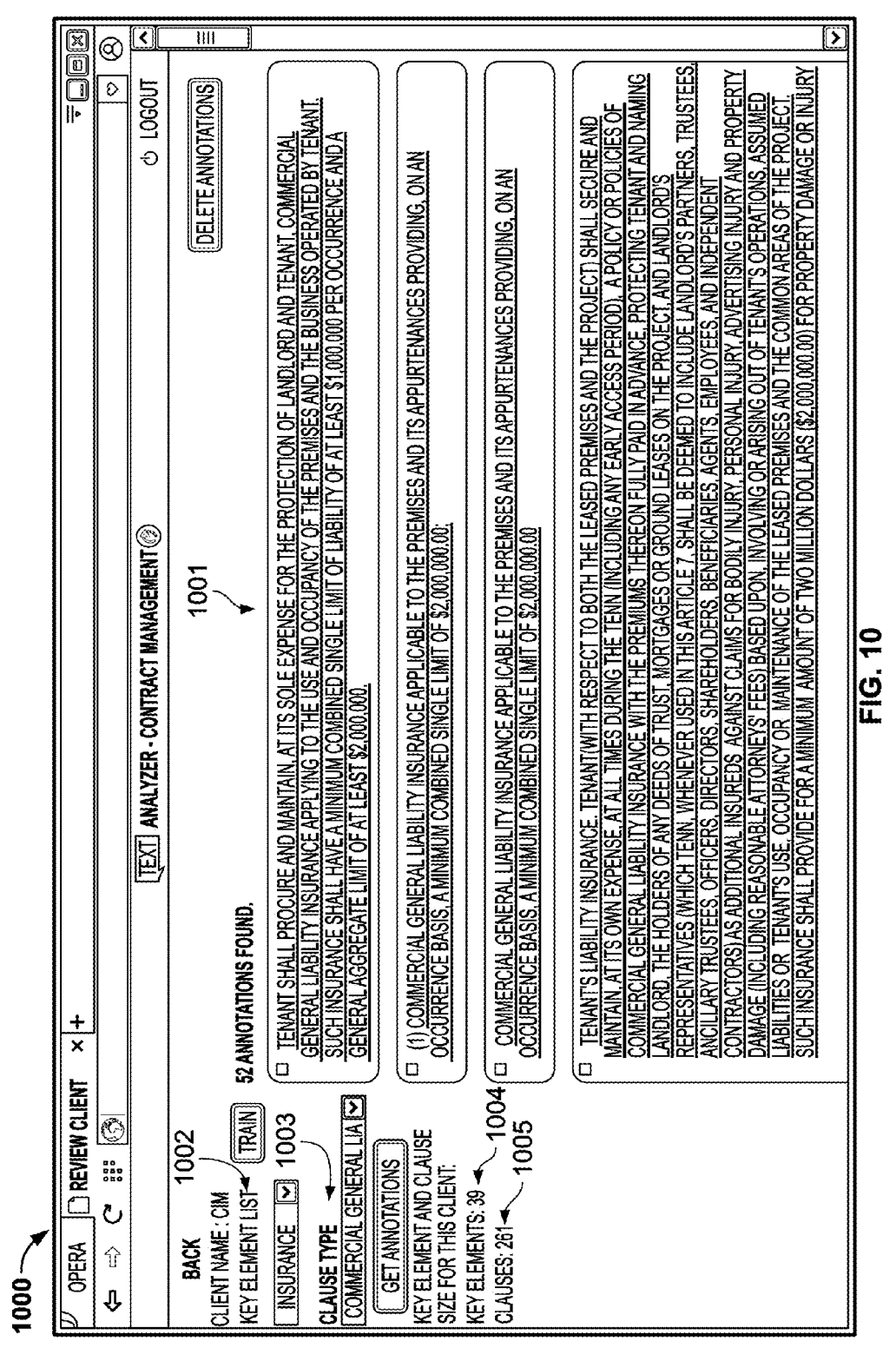

FIG. 10 shows an example of displaying annotations for key elements and clause types of a client document 1000. After a client is selected, the annotations 1001 for the combinations of key elements and clause types may be added. The annotations may be added by SMEs, and may include example abstractions of leases for a particularly key element and clause type combination. The annotations may be notes or extraction text that are created and added by SMEs for a key element and clause type combination according to selected text from the documents. As shown in FIG. 10, the client CIM is selected. For the combination of key element insurance 1002 and clause type commercial general liability 1003, fifty-two (52) annotations are created and entered by SMEs. FIG. 10 also shows that the client CIM has thirty-nine (39) key elements 1004 and two hundred and sixty one (261) clauses 1005.

Figure 11:
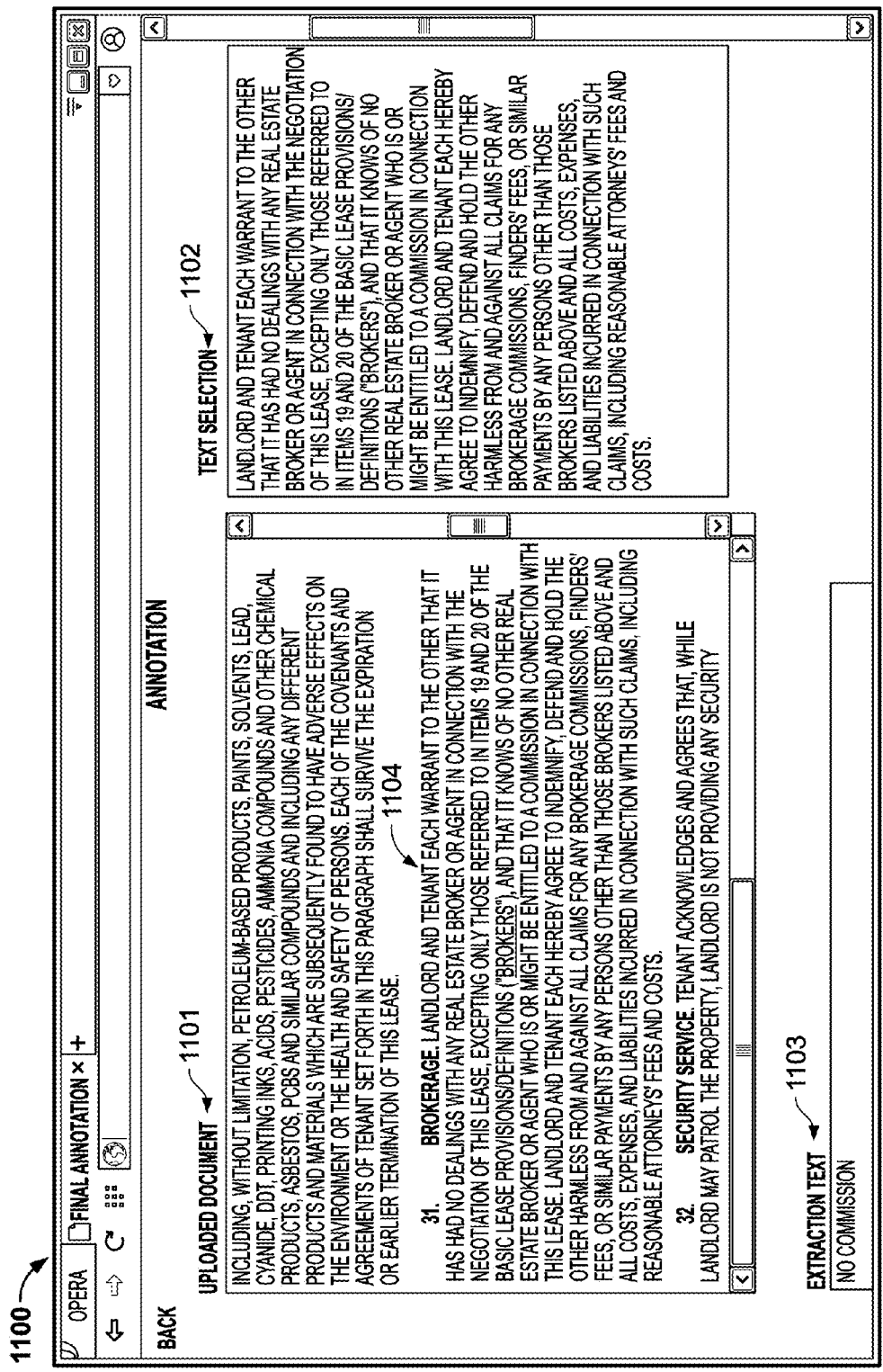
FIG. 11 shows an example of an annotation for a selected text of an uploaded document.

FIG. 11 shows an example of an annotation for a selected text of an uploaded document 1100. As shown in FIG. 11, a section of uploaded document 1101 for brokerage is identified, and the highlighted text 1104 from the document for brokerage is selected and put to the text selection section of the user interface, and the annotation of the extraction text 1103 "no commission" for the selected text 1102 is created and added.

Figure 12:
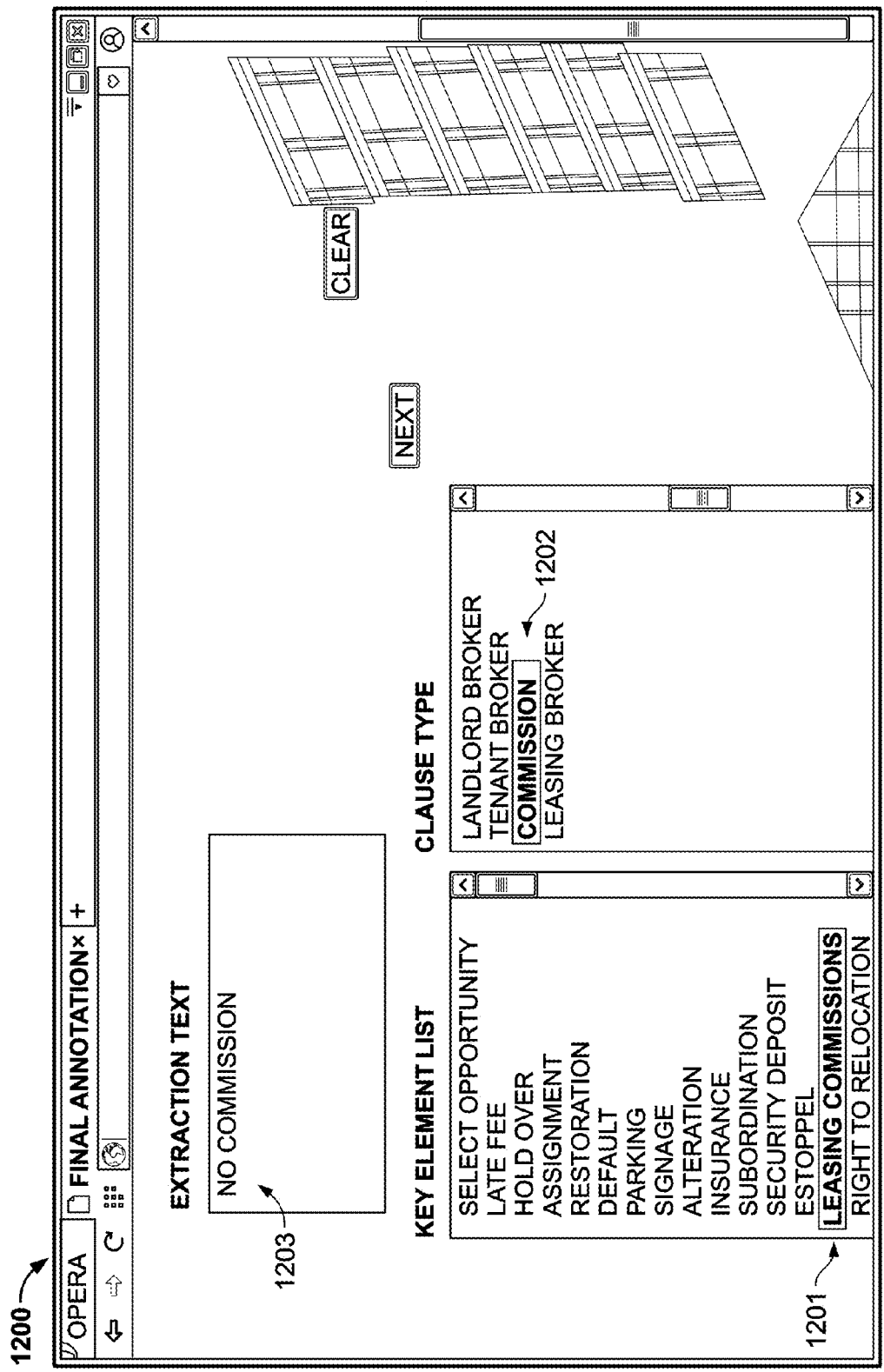
FIG. 12 shows an example of associating an annotation with a key element and a clause type.

FIG. 12 shows an example of associating an annotation with a key element and a clause type 1200. As shown in FIG. 12, the combination of the key element leasing commissions 1201 and clause type commission 1202 is associated with the extraction text "no commission" 1203.

Figure 13:
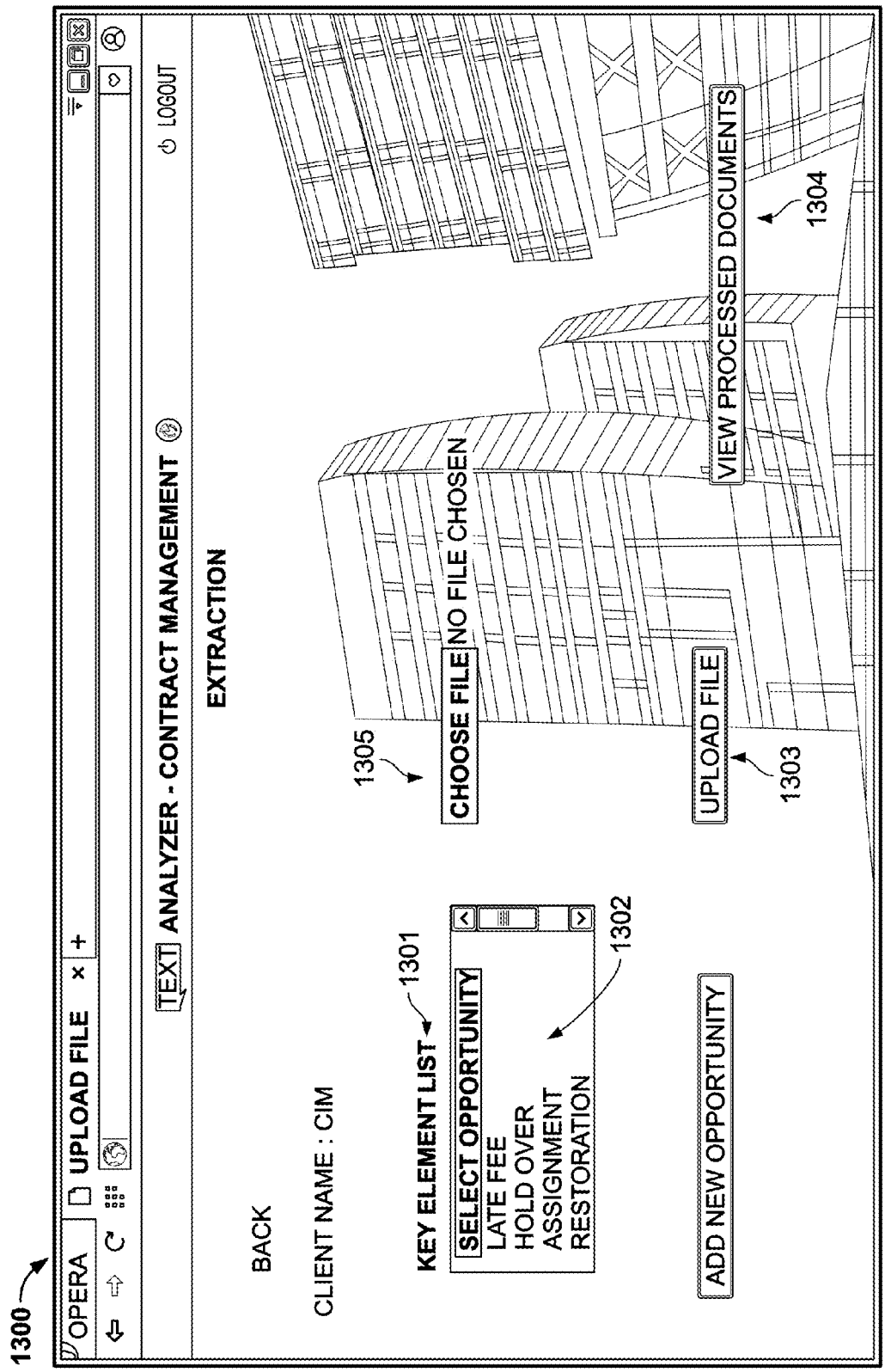
FIG. 13 shows an example of extracting for a selected key element from a selected document.

FIG. 13 shows an example of extracting for a selected key element from a selected document 1300. After SMEs create annotations for the document, and a model may be created by using the data profiler and machine learning module. The model may be trained. Subsequently, the trained model may be used for automating information abstraction process for documents. Sometimes, a list of key elements identified in the model may be displayed in a user interface for the user to select, and the document may be uploaded and extracted. The processed document may be displayed in the user interface. As shown in FIG. 13, a list of key element 1301 for client CIM is displayed in the user interface, and a drop down selection 1302 for the key element is provided for a user to select key element(s) from the list including late fee, hold over and assignment. The document may be chosen 1305 and uploaded 1303. According to the one or more selected key elements from the drop down selection of the key element list of the document, the document may be extracted and processed. The processed document(s) may be viewed 1304 by using the user interface per the user's selection in the user interface.

Figure 14:
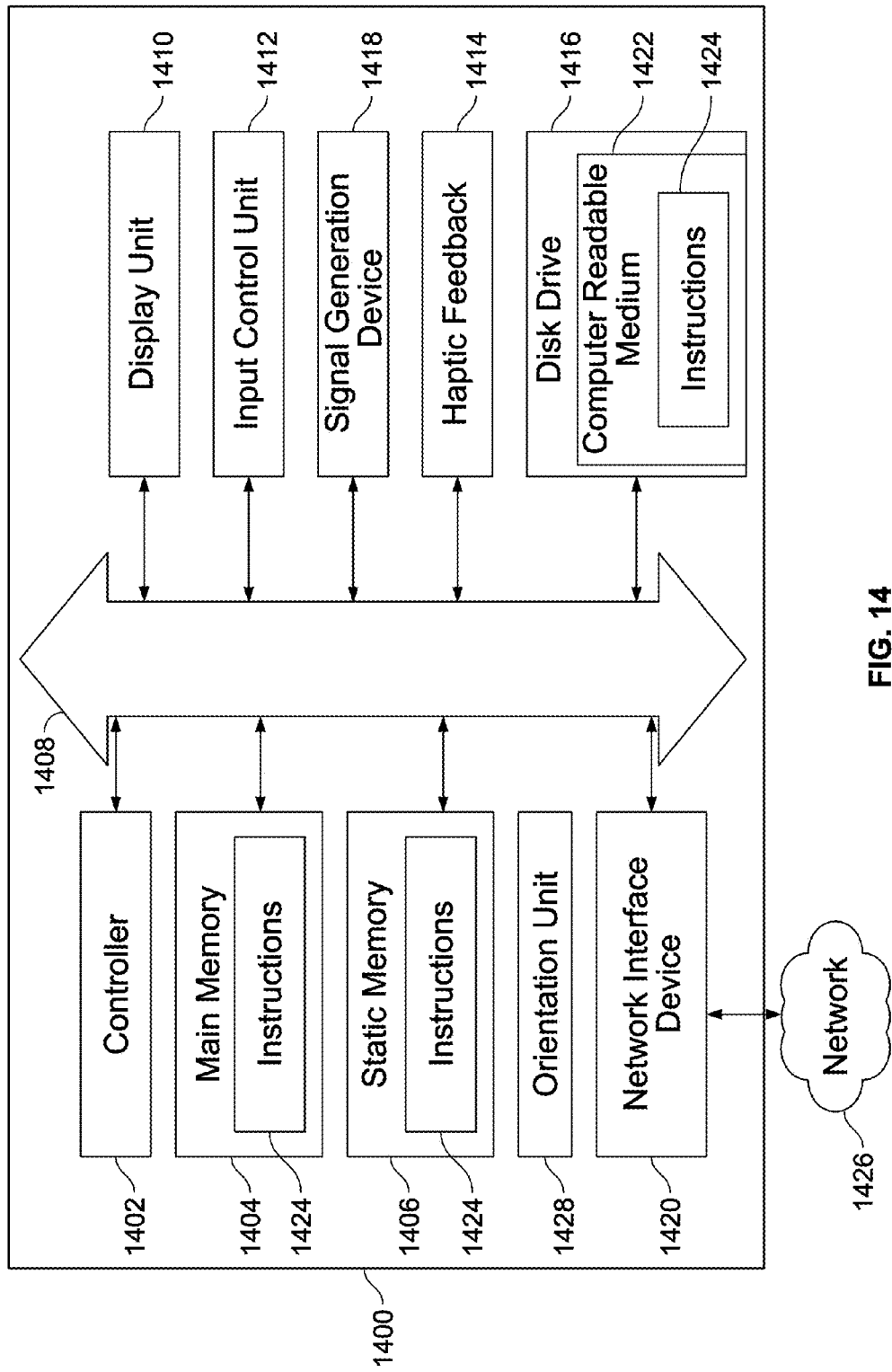
FIG. 14 illustrates an example of a computer system that may be used for automating the information abstraction process.

FIG. 14 illustrates an example of a computer system that may be used for automating information abstraction process for documents. Referring to FIG. 11, an illustrative embodiment of a computer system that may be used for one or more of the components illustrated by the method, the processing pipeline and system in FIGS. 1-3, or in any other system configured to carry out the methods discussed in this disclosure herein, is shown and is designated 1400. Although the computer system 1400 is illustrated in FIG. 14 as including all of the components as illustrated, it is within the scope of this innovation for the computing system to be comprised of fewer, or more, components than just illustrated in FIG. 14.

The computer system 1400 can include a set of instructions 1424 that can be executed to cause the computer system 1400 to perform any one or more of the methods, processes or computer-based functions disclosed herein. For example, a automating information abstraction process as described herein may be a program comprised of a set of instructions 1424 that are executed by the controller 1402 to perform any one or more of the methods, processes or computer-based functions described herein. Such a program may be stored in whole, or in any combination of parts, on one or more of the exemplary memory components illustrated in FIG. 14, such as the main memory 1404, static memory 1406, or disk drive 1416.

As described, the computer system 1400 may be mobile device. The computer system 1400 may also be connected using a network 1418, to other computer systems or peripheral devices. In a networked deployment, the computer system 1400 may operate in the capacity of a server or as a client user computer in a server-client user network environment, or as a peer computer system in a peer-to-peer (or distributed) network environment. In addition to embodiments in which the computer system 1400 is implemented, the computer system 1400 may also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computer system 1400 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 14, the computer system 1400 may include a controller 1402, such as a central processing unit ("CPU"), a graphics processing unit ("GPU"), or both. Moreover, the computer system 1400 can include a main memory 1404, and additionally may include a static memory

1406. In embodiments where more than one memory components are included in the computer system 1400, the memory components can communicate with each other via a bus 1408. As shown, the computer system 1400 may further include a display unit 1410, such as a liquid crystal display ("LCD"), an organic light emitting diode ("OLED"), a flat panel display, a solid state display, or a cathode ray tube ("CRT"). Additionally, the computer system 1400 may include one or more input devices 1412, such as a keyboard, push button(s), scroll wheel, digital camera for image capture and/or visual command recognition, touch screen, touchpad or audio input device (e.g., microphone). The computer system 1400 can also include signal outputting components such as a haptic feedback component 1414 and a signal generation device 1418 that may include a speaker or remote control.

Although not specifically illustrated, the computer system 1400 may additionally include a GPS (Global Positioning System) component for identifying a location of the computer system 1400.

Additionally, the computer system 1400 may include an orientation unit 1428 that includes any combination of one or more gyroscope(s) and accelerometer(s).

The computer system 1400 may also include a network interface device 1420 to allow the computer system 1400 to communicate via wireless, or wired, communication channels with other devices. The network interface device 1420 may be an interface for communicating with another computer system via a Wi-Fi connection, Bluetooth connection, Near Frequency Communication connection, telecommunications connection, internet connection, wired Ethernet connection, or the like. The computer system 1400 may also optionally include a disk drive unit 1416 for accepting a computer readable medium 1422. The computer readable medium 1422 may include a set of instructions that are executable by the controller 1402, and/or the computer readable medium 1422 may be utilized by the computer system 1400 as additional memory storage.

In a particular embodiment, as depicted in FIG. 14, the disk drive unit 1416 may include a computer-readable medium 1422 in which one or more sets of instructions 1424, such as software, can be embedded. Further, the instructions 1424 may embody one or more of the methods, processes, or logic as described herein. In a particular embodiment, the instructions 1424 may reside completely, or at least partially, within the main memory 1404, the static memory 1406, and/or within the controller 1402 during execution by the computer system 1400. The main memory 1404 and the controller 1402 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present computer system 1100 may encompass software, firmware, and hardware implementations. The term "module" or "unit" may include memory (shared, dedicated, or group) that stores code executed by the processor.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 1422 that includes instructions 1424 or receives and executes instructions 1424 responsive to a propagated signal; so that a device connected to a network 1418 can communicate voice, video or data over the network 1418. Further, the instructions 1424 may be transmitted or received over the network 1418 via the network interface device 1420.

While the computer-readable medium 1424 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 1422 can include a solid-state memory such as a memory card or other package that houses one or more non-volatile read-only memories, such as flash memory. Further, the computer-readable medium 1422 can be a random access memory or other volatile re-writable memory. Additionally, the computer-readable medium 1422 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 1422 or a distribution medium and other equivalents and successor media, in which data or instructions may be stored. The computer readable medium may be either transitory or non-transitory.

Although the present specification describes components and functions that may be implemented in particular embodiments with reference to particular standards and protocols commonly used by organizations with a need for automating information abstraction process for documents, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It is to be understood that, all examples provided above are merely some of the preferred examples of the present disclosure. For one skilled in the art, the present disclosure is intended to cover various modifications and equivalent arrangements included within the principle of the disclosure.

The invention claimed is:

1. A computer-implemented system for creating a hierarchical semantic map of a document and extracted information, comprising: a processor and a non-transitory computer readable medium storing processor executable instructions configured to cause the processor to:

apportion, with the processor, the document into major sections by accessing the document and recognizing a hierarchical structure of the document, the hierarchical structure comprising multiple levels;

divide the document into the major sections according to the hierarchical structure;

access a machine learning model including a plurality of classifiers configured to classify portions of the document, each of the plurality of classifiers for a respective level of the multiple levels of the hierarchical structure;

classify, with the processor, each of the major sections of the document by using a first classifier included in the plurality of classifiers, and map the major sections to the key elements;

search, with the processor, one major section that is mapped to one key element, and identify sub-sections within the one major section, the sub-sections including granular level pieces of information comprising sub-granular clause types;

select a second classifier from the plurality of classifiers according to features of the one major section, wherein the features achieve a maximum confidence score by the second classifier, wherein the maximum confidence score indicates that the sub-sections associate with at least one of the key elements;

classify, with the processor, each of the granular level pieces of information using the second classifier selected for the one major section, and map each of the sub-sections to at least one of the key elements;

extract granular level pieces of information corresponding to the sub-granular clause types from the identified sub-sections by using sequence modelers and linguistic characteristics provided by a data profiler, the data profiler configured to recognize linguistics characteristics of the extracted information, wherein the linguistics characteristics comprise predicates, structures, neighboring characters, and types of data that induce regular expressions of the extracted information, wherein the sequence modelers are previously trained based on an annotated corpus;

generate the hierarchical semantic map of the document by using the extracted information according to the hierarchical structure, and store the extracted information and the hierarchical semantic map in a database; and present in a user interface in a user display device drop down selections of the key elements of the document, and in response to a selection of one of the key elements, display the extracted information associated with the selected key element.

2. The computer-implemented system of claim 1, wherein the processor executable instructions further cause the processor to create the data profiler by using the annotated corpus, wherein the processor executable instructions further cause the processor to:

recognize numerical characteristics comprising an average length of the extracted information.

3. The computer-implemented system of claim 1, wherein the document comprises multiple levels according to the hierarchal structure, the multiple levels including a first level, a second level that is subordinate to the first level which comprises the key elements, and a third level that is subordinate to the second level which comprises the clause types, wherein the first classifier is selected for the first level, the second classifier is selected for the second level, wherein the first classifier is different than the second classifier.

4. The computer-implemented system of claim 1, wherein instructions configured to cause the processor to select the second classifier further comprise:

selecting, based on the maximum confidence score, a classification model from a group comprising a Support Vector Machine, a Random Forest, and a Multinomial Naïve Bayes.

5. The computer-implemented system of claim 1, wherein the processor executable instructions further cause the processor to:

regenerate the machine learning model and the data profiler to be stored in the database according to a feedback for the generated hierarchical semantic map and the extracted information wherein the feedback is received from a subject matter expert through a user interface.

6. A computer-implemented method for creating a hierarchical semantic map of a document and extracted information, comprising:

apportioning, with a data processor, the document into major sections by accessing the document and recognizing a hierarchical structure of the document;

dividing the document into major sections according to the hierarchical structure;

accessing a machine learning model including a plurality of classifiers configured to classify portions of the document, each of the plurality of classifiers for a respective level of the hierarchical structure;

classifying, with the data processor, each of the major sections of the document by using a first classifier included in the plurality of classifiers, and mapping the major sections to the key elements;

searching with the data processor one major section that is mapped to one key element, and identifying sub-sections within the one major section, the sub-sections including granular level pieces of information comprising sub-granular clause types forming the one key element according to the machine learning model;

selecting a second classifier from the plurality of classifiers according to features of the one major section, wherein the features achieve a maximum confidence score by the second classifier, wherein the maximum confidence score indicates that the sub-sections associate with at least one of the key elements;

classifying, with the processor, each of the granular level pieces of information using the second classifier selected for the one major section, and map each of the sub-sections to at least one of the key elements;

extracting the granular level pieces of information corresponding to the sub-granular clause types from the identified sub-sections by using sequence modelers and linguistic characteristics provided by a data profiler, the data profiler configured to recognize linguistics characteristics of the extracted information, wherein the linguistics characteristics comprise predicates, structures, neighboring characters, and types of data that induce regular expressions of the extracted information, wherein the sequence modelers are previously trained based on an annotated corpus;

generating the hierarchical semantic map of the document by using the extracted information according to the hierarchical structure, and storing the extracted information and the hierarchical semantic map in a memory storage device database; and presenting in a user interface on a user display device drop down selections of the key elements of the document, and in response to a selection of one of the key elements, displaying the extracted information associated with the selected key element.

7. The computer-implemented method of claim 6, further comprising creating the data profiler by using the annotated corpus, comprising:
   recognizing numerical characteristics comprising an average length of the extracted information.

8. The computer-implemented method of claim 6, wherein the step of dividing the document further comprises:
   identifying, in the document, according to multiple levels of the hierarchical structure, a first level, a second level that is subordinate to the first level which comprises the key elements, and a third level that is subordinate to the second level which comprises the clause types.

9. The computer-implemented method of claim 6, wherein the step of selecting the second classifier further comprises:
   selecting, based on the maximum confidence score, a classification model for the second classifier from a group of classification models comprising a Support Vector Machine, a Random Forest, and a Multinomial Naive Bayes.

10. The computer-implemented method of claim 6, further comprising:
    regenerating the machine learning model and the data profiler to be stored in the database according to a feedback for the generated hierarchical semantic map and the extracted information wherein the feedback is received from a subject matter expert through a user interface.

11. A non-transitory computer readable storage medium comprising a plurality of instructions executable by a processor, the instructions comprising:
    instructions executable by the processor to apportion the document into major sections by accessing the document and recognizing a hierarchical structure of the document;
    instructions executable by the processor to divide the document into the major sections according to the hierarchical structure;
    instructions executable by the processor to access a machine learning model including a plurality of classifiers configured to classify portions of the document, each of the plurality of classifiers for a respective level of the hierarchical structure;
    instructions executable by the processor to classify each of the major sections of the document by using a first classifier included in the plurality of classifiers, and map the major sections to the key elements;
    instructions executable by the processor to search, with the processor, one major section that is mapped to one key element, and identify sub-sections within the one major section, the sub-sections including granular level pieces of information comprising sub-granular clause types;
    instructions executable by the processor to select a second classifier from the plurality of classifiers according to features of the one major section, wherein the features achieve a maximum confidence score by the second classifier, wherein the maximum confidence score indicates that the sub-sections associate with at least one of the key elements;
    instructions executable by the processor to classify, with the processor, each of the granular level pieces of information using the second classifier selected for the one major section, and map each of the sub-sections to at least one of the key elements;
    instructions executable by the processor to extract granular level pieces of information corresponding to the sub-granular clause types from the identified sub-sections by using sequence modelers and linguistic characteristics provided by a data profiler, the data profiler configured to recognize linguistics characteristics of the extracted information, wherein the linguistics characteristics comprise predicates, structures, neighboring characters, and types of data that induce regular expressions of the extracted information, wherein the sequence modelers are previously trained based on an annotated corpus;
    instructions executable by the processor to generate the hierarchical semantic map of the document by using the extracted information according to the hierarchical structure, and store the extracted information and the hierarchical semantic map in a database; and
    instructions executable by the processor to present in a user interface in a user display device drop down selections of the key elements of the document, and in response to a selection of one of the key elements, display the extracted information associated with the selected key element.

12. The non-transitory storage medium of claim 11, further comprising:
    instructions executable by the processor to create the data profiler by using the annotated corpus; and
    instructions executable by the processor to recognize numerical characteristics comprising an average length of the extracted information.

13. The non-transitory storage medium of claim 11, wherein the document comprises multiple levels according to the hierarchal structure, the multiple levels including a first level, a second level that is subordinate to the first level which comprises the key elements, and a third level that is subordinate to the second level which comprises the clause types, wherein the first classifier is selected for the first level, the second classifier is selected for the second level, wherein the first classifier is different than the second classifier.

14. The non-transitory storage medium of claim 11, wherein instructions executable by the processor to select the second classifier further comprise:
    instructions executable by the processor to select, based on the maximum confidence score, a classification model for the second classifier from a group comprising a support vector machine, a random forest and a multinomial Naïve Bayes.

15. The non-transitory storage medium of claim 11, further comprising
    instructions executable by the processor to regenerate the machine learning model and the data profiler to be stored in the database according to a feedback for the generated hierarchical semantic map and the extracted information wherein the feedback is received from a subject matter expert through a user interface.

* * * * *